United States Patent [19]
Baumann et al.

[11] Patent Number: 5,870,171
[45] Date of Patent: Feb. 9, 1999

[54] METHOD, APPARATUS AND DEVICE FOR THE REDUCTION OF THE IMAGE STEADINESS ERROR IN THE PRODUCTION OF FILMS

[75] Inventors: Hans Baumann, Raisdorf; Roger Glag, Quarnbek; Manfred Wieland, Kiel, all of Germany

[73] Assignee: Raytheon Anschutz GmbH, Germany

[21] Appl. No.: 848,508

[22] Filed: Apr. 28, 1997

[30] Foreign Application Priority Data

Apr. 30, 1996 [DE] Germany ............................ 196 17 291.

[51] Int. Cl.$^6$ .............................. G03B 21/46; G03B 1/00
[52] U.S. Cl. ............................................. 352/160; 352/160
[58] Field of Search ................................. 352/105–120, 352/160–165

[56] References Cited

U.S. PATENT DOCUMENTS 4,003,645  1/1977  Broecki et al. ......................... 352/109
5,088,812  2/1992  Weigert ................................... 352/105
5,608,474  3/1997  Fujiwara et al. ........................ 352/160

Primary Examiner—Russell Adams
Attorney, Agent, or Firm—Shlesinger, Fitzsimmons & Shlesinger

[57] ABSTRACT

The invention concerns the elimination of the image steadiness error in the projection of films, which consist of individual images.

For this purpose, the image steadiness error is detected by a sensor and is compensated for by a device for step size compensation.

An apparatus for the measurement of the image position in the projection films which consist of individual images has a sensor for the measurement of the image steadiness error by making use of the perforation.

In a device for the correction of an image steadiness error of films which consist of individual images, an optical compensator is arranged before the films as an optical storage medium and/or before the optical photography medium.

18 Claims, 10 Drawing Sheets

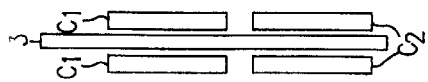
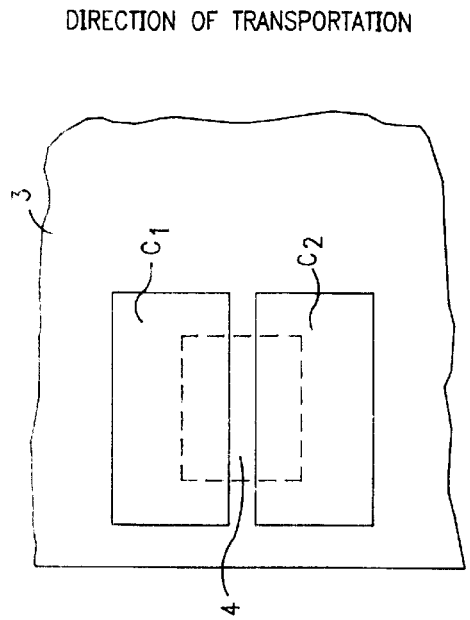
FIG. 2
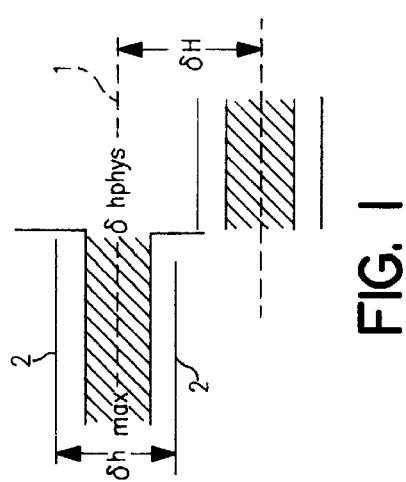
FIG. 1
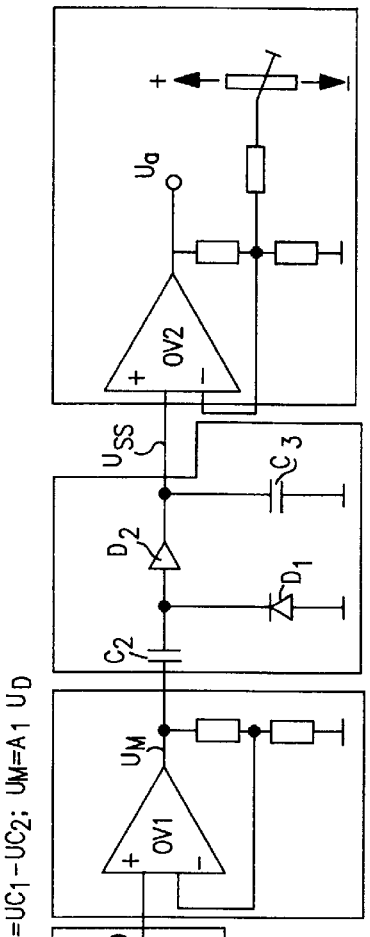
FIG. 3
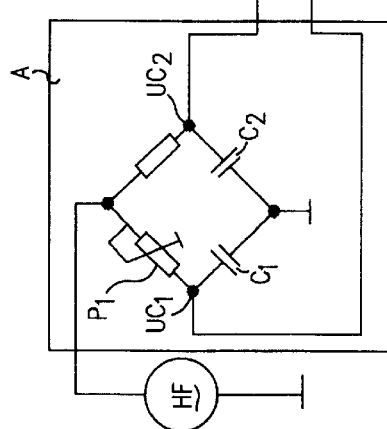

METHOD, APPARATUS AND DEVICE FOR THE REDUCTION OF THE IMAGE STEADINESS ERROR IN THE PRODUCTION OF FILMS

BACKGROUND OF THE INVENTION

The invention concerns a method for the reduction of the image steadiness error in the projection of films, which consist of individual images, in accordance with the preamble to claim 1, an apparatus for the measurement of the image position in accordance with the preamble to claim 13, and a device for the correction of an image steadiness error in accordance with the preamble to claim 20.

When making a film, the film in the camera is moved step by step past the screen window for the exposure.

After the development and the production of a copy, which is conventionally produced in the contact exposure process, the film strip is available with its sequence of individual images. For reproduction by means of a projector, the film strip is moved step by step past the projection lens, whereby because of the rapid succession of the projection of the phase images, physiologically the impression of a continous movement process is caused.

The transport step is realized by mechanical step switch mechanisms (Maltese cross/projector, gripper drive/camera) or also by step motors or controlled direct current drives.

The attainable precision of the step size of the camera drive, of the reproduction drive and the division of the film strip define the image steadiness which is to be achieved. If the image steadiness is unsatisfactory, the next image will not be as exactly projected on the same position of the screen as the previous image. This error is described as the image steadiness error.

A reduction of the image steadiness error below the range which is visible to the observer or even only an approximation to this order of magnitude is yet not possible, to this day.

The camera producers of film cameras attempt to minimize the image steadiness errors caused by the camera. The same applies to the producers of film projectors. The exactnesses of the film strip are defined in a corresponding norm.

Everything is done on the premise of keeping the partial errors below 0.1% and from the aspect that the errors of the others are predetermined. The partial errors are time offset, position offset and are dependent on different apparatus, users and methods, and therefore they cannot be influenced. Even if one's own partial errors, which can only be influenced from this point of view, can be reduced to zero, there remains a theoretical residual error of 0.2%. But in practice, the largest share of errors is due to the projector.

As a further complication, there is the fact that it is necessary to make all the methods compatible with the immense quantities of film material which are available today on the market and which arrive day by day. It makes no sense to deprive these films of their economic usefulness by special solutions.

A method, as decribed in the introductory part of claims 1, 13 and 18 is disclosed in DE 39344 20 C2. For measuring the steadiness of image sensors are provided, and a compensation of deviations is provided by generating error tables and by an adaptive empirical control of the drive motor.

In the U.S. Pat. No. 5,175,580 a photo camera is disclosed which provides an optical compensation of vibrations at free hand photography, i.e. an image stabilisation.

SUMMARY OF THE INVENTION

It is therefore the object of the invention to develop a method, an apparatus and a device which make possible a clear reduction of the image steadiness error in the projection of films.

In accordance with the invention, this problem is solved by a process in accordance with claim 1, an apparatus in accordance with claim 13 as well as a device in accordance with claim 20.

In this connection, step size compensation is to be performed by means an optical compensation. Thereby it is possible to project the images of a film, for example of a cinema film, in a defined time sequence and always exactly on the same point on a screen. This leads to substantially better presentation for the observer.

Other advantageous features are described in the description of the figures which now follows.

The invention is explained below in exemplary manner on the basis of drawings, in which further important features as well as explanations for the purpose of better understanding and embodiment possibilities of the inventive idea are described

BRIEF DESCRIPTION OF THE DRAWINGS

FIG. 1 a sketch for the explanation of the image steadiness error;

FIG. 2 the basic structure of a capacitive sensor for the measurement of the position of an image during projection;

FIG. 3 a diagrammatic view of the necessary signal processing circuit for the signals of the sensor from FIG. 3;

DESCRIPTION OF THE PREFERRED EMBODIMENTS

Figure 4A:
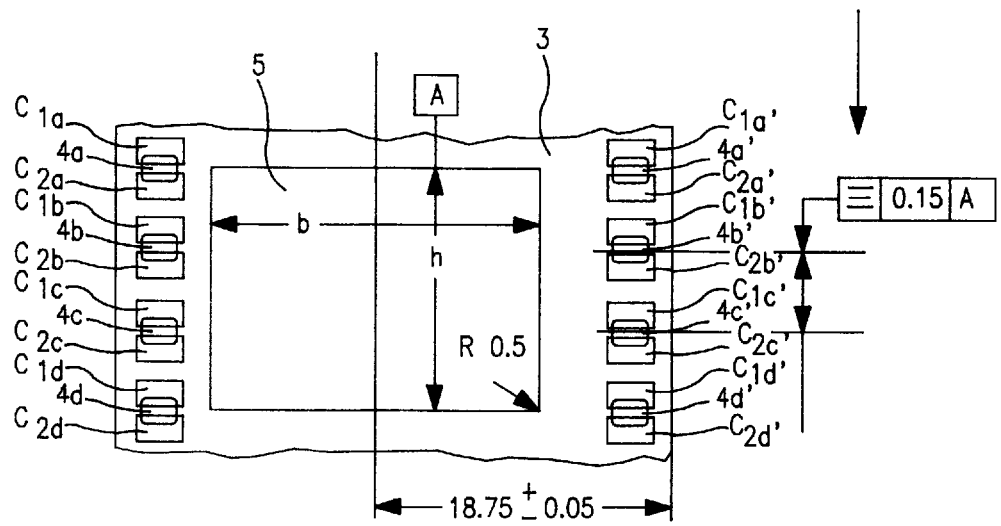
FIG. 4a a use of the sensor from FIG. 3 for the horizontal measurement of the image position.

In FIG. 1, there is a drawing to explain the image steadiness error, which is caused by image steadiness fluctuations in a projector during film projection.

$\delta h_{max}$ designates the "mechanical maximal value" of the image steadiness fluctuation, $\delta h_{phys}$ the "physiological maximal value" of the image steadiness fluctuation of the fast period, $\delta H$ designates the center line fluctuation of the slow period. (1) designates the center axis and (2) the limits of the fast fluctuation.

An image steadiness error is conspicuous in two ways. Firstly, there is a fluctuation of the outlines of the object which is shown of the magnitude $\delta h_{max}$ around a conceptual center line(1) with a frequency which corresponds to the image frequency of the drive. At the same time the position of this center line (1) changes by an amount $\delta_H$ in an irregular movement. This fluctuation is about 100 times slower than the normal image frequency and it becomes noticeable due to the movement of the image.

The image steadiness errors in the faster period result in a blurring and obliteration of the contours of the image and therefore in a contrast reduction.

In the ideal case, the image steadiness error should be so small that it is no longer perceptible by the eye, i.e. smaller than the resolution capacity of the eye. The admissible image steadiness errors which result therefrom, when considering the possible vision defect, are:

| format | windows width | image steadiness | | (optimal admissible error) |
|---|---|---|---|---|
| 35 mm | 20,9 mm | 7,35 μm | + | 0,035% |
| 16 mm | 9,6 mm | 3,36 μm | + | 0,035% |

The values above cannot be attained with the known method in accordance with the known prior art. A weakening of the demand for image steadiness errors which are still admissible and which are not yet perceived subjectively by the observer as disturbing leads to the following data:

| format | window width | image steadiness | (acceptable error) |
|---|---|---|---|
| 35 mm | 20,9 mm | 62,7 μm | 0,3% |
| 16 mm | 9,6 mm | 28,8 μm | 0,3% |

The above values are worse by almost a factor of 10 than the theoretical admissable value.

If one assumes theoretically that the individual errors (photo, film strip, reproduction) contribute in the same proportions to the total error, then a precision requirement of 0.1% results for all the components which take part in the "mechanical" imaging, i.e. the film camera, film strip as well as the projector.

Based on the components, a partial image steadiness error of 0.1% can only be achieved with difficulty at high cost and, in the final analysis, it is only a compromise which is predetermined by technical feasibility.

A reduction of the image steadiness error below the range which is visible to the observer or even only an approximation to this order of magnitude has not been possible until now.

It is precisely these cinematic imaging errors, together with the different screen luminosity densities, which are the reason for the clear difference in quality between a film image and a diaprojection.

Now it is possible to displace the position of the projected image on the screen by an optical compensator so that the errors of the mechanical step can be substantially reduced for the observer.

It is possible to compensate optically for the mechanical step errors during projection. In accordance with the example of an embodiment in FIG. 7, for this purpose a plane-parallel glass plate (22) is inserted in the ray path of the projector between the image window behind the film strip (20) and the lens (21). This glass plate (22) is so large that all the light rays of the projection lamp (23), which take part in the imaging, pass through it.

The plate (22) is located so that it can be rotated in both directions around an axis passing through it on the level of the image center, by a motor (for example a torquer or step motor).

If the plane-parallel glass plate (22) is not perpendicular to the optical axis (24), the light rays passing through it undergo a parallel displacement. This parallel displacement can be altered depending on the rotation angle and therefore on the impact angle. The condition results from the refraction law of Snellius (FIG. 14):

$$\Delta s = d \cdot \sin(1 - 1/n)$$

The position of the image on the screen therefore results from two processes:

Firstly from the feed of the step drive mechanism and secondly from the displacement of the image depending on the direction of rotation and the rotational angle of the plane-parallel glass plate (22).

Demands are scarcely made on the precision of the step drive mechanism. The mechanical and/or electromechanical drive can be simplified, imprecise and therefore the costs can be reduced.

The step error has only to be so small that it can still be compensated for by the rotation of the glass plate (22) (maximal rotational angle with predetermined glass thickness and refraction index). The mechanical cost is reduced, resultant inaccuracies due to wear and tear can be automatically compensated by a suitable arrangement.

The advantage is that it becomes possible to correct the position of the image optically, without intervention in the mechanical transport mechanisms with the large masses present there, inertia moments, and the other inadequacies which cannot be calculated, such as slippage, stretch, wear and tear etc.

Apart from the horizontal image steadiness error which was explained in detail, there is also a corresponding vertical image steadiness error. But this error is usually far smaller and more easily overcome. It is determined by the movement of the film. The vertical image steadiness error can be optically compensated for in the same way as the horizontal image steadiness error. The rotational axis of a corresponding plane-parallel glass plate, however, is perpendicular to the optical axis of the projector.

The compensation for both errors (horizontal and vertical) is possible by using two plane-parallel glass plates, with rotational axes perpendicular to each other, or by a cardanically suspended glass plate having two independent drive components.

Apart from the method for image steadiness correction described above, there is also the possibility of parallel displacement of a lens of the objective system or the use of rotating wedges (not shown in the figures).

In order to be able to improve the image steadiness in one of the ways mentioned or to compensate for it, it is necessary to detect the image steadiness error, in order to be able to derive a control of the optical compensation from the measured deviation. The measurement of the actual transport step and its deviation from the rated value 19 mm should be carried out as close as possible to the projection window. Because this concerns a sum of individual errors, only those errors can be measured and therefore corrected which occur on the route between the drive (e.g. Maltese cross) and the position of the sensor.

The direct drive of the film is performed by the sprocket wheel. A rotation of the sprocket wheel consists normally of four partial steps of 90° corresponding to four images. The actual step size (exact rotational angle of 90°) can be picked up on the sprocket wheel by means of an index disc with sufficiently high division, preferably optically 90° angles of rotation correspond to a step size of 19 mm. In order to be able to achieve an image steadiness quality of 0.1%, positioning accuracy of 20 $\mu$m is necessary. This corresponds to a division of >4×950=3800 increments with corresponding absolute accuracy.

A more economical alternative is to demand the high angle resolution only in narrow zones which correspond to the respective step end.

Figure 8:
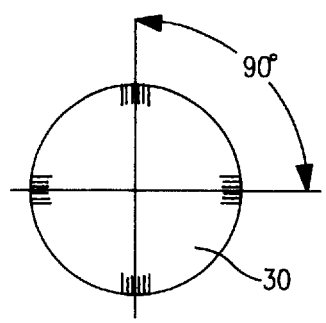
FIG. 8 an exemplary embodiment example for an incremental sensor.

This can be achieved by a 360° index disc (30) with partial angular resolution (see FIG. 8).

The residual image steadiness error which is caused by the projector results only from inaccuracies (e.g. film stretch), which are caused by the spatial discrepancy between the sensor and the projection window.

Figure 7:
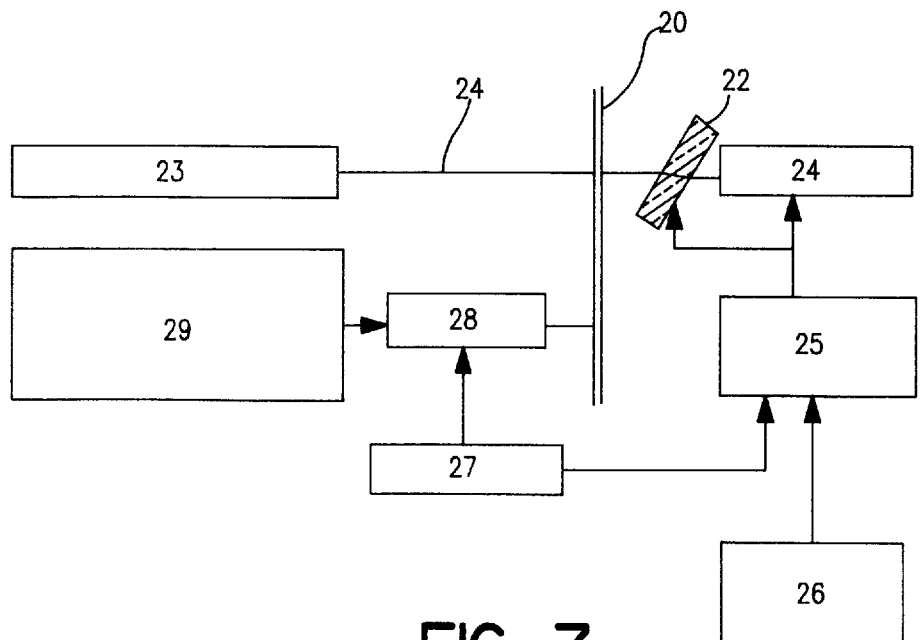
FIG. 7 the functional structure of an optical compensation of step errors.

The schematic drawing in FIG. 7 shows the total system which is needed for image steadiness correction (shown here only for horizontal image steadiness correction), consisting of:

image steadiness measurement device (sensor) (27) on the sprocket wheel (28) of a mechanical drive (29) (general drive, Maltese cross, step motor, positioning motor), reference signal source (corresponding to 19 mm rated step size) (step size reference 26), comparator for rated/actual value and control with control step for the setting member (25), optical compensator (plane-parallel plate, rotary wedge, translatory displaceable lens) (22).

In order to avoid errors as far as possible, however, position determination should be carried out directly on the film strip itself and therefore preferably on the level of the image window.

The problem is to find a suitable marking or structure on the film strip which would be suitable to carry out position determination.

There are no uniform optical markings. Image lines, frames, windows, sound tracks etc. vary under certain circumstances from film to film.

The copying of marks which could be scanned later, whether optically or as sound, would introduce an incompatibility with the already existing film material and it is therefore not practicable.

The sole feature which has a certain precision and is standard throughout the world is the perforation. However, it is not possible, for example, to detect a perforation edge optically with sufficient precision, which has to be in the order of magnitued of <20 $\mu$m, in order to arrive in a range which is already possible today in any case by purely mechanical means.

In this connection it should be considered that the perforation holes are stamped, i.e. they do not have steep flanks. In addition, the holes may become frayed and/or polluted when in use.

However, one can avoid the problems described above and still achieve a precision measurement which is also usable in routine operation (cinema).

Based on the considerations above, only an integrated measurement process is in question, in which geometrical inadequacies or local variations do not have an effect on the optical properties.

This can be achieved with a capacitive sensor, as shown in FIG. 2.

The sensor consists of a difference capacitor ($C_1$, $C_2$). The film (3) passes through the two plates, of which the capacitor ($C_1$, $C_2$) consists. In the central position shown, the perforation hole (4) in the film 3 is symmetrical to the capacitors ($C_1$, $C_2$). The capacity of the respective capacitors ($C_1$, $C_2$) is computed as follows:

$$C = (\Sigma r \times \Sigma o \times F)/d \qquad \text{formula 1}$$

$$C = ((\Sigma o \times ((\Sigma rf + \Sigma rl)/2)) \times F)/d \qquad \text{formula 2}$$

where $\Sigma rf$:=dielectricity constant of the film material

F:=area of the capacitor plates $\Sigma o$:=electrical field constant d:=plate spacing $\Sigma rl$:=dielectricity constant of the air For simplified estimation, it is assumed that the capacitor plates have an area which is identical with the size of the aperture (4). Formula 2 takes into consideration the fact that the plate spacing is greater than the thickness of the film material and that the effective dielectric is composed of the relative dielectricity constants of the air share and of the film share.

Depending on the position of the film strip (3), the position of the perforation hole (4) changes with respect to the capacitors ($C_1$, $C_2$)

In the position shown in FIG. 2, the capacities $C_1$, $C_2$ are of equal size. If the film (3) is transported in the direction upwardly in FIG. 2, the perforation hole (4) migrates further and further into the capacitor $C_1$ and reduces the capacitance, because thereby the dielectric also changes. The capacitance of the capacitor $C_2$, on the other hand, increases in the same degree because of the increase in the dielectric share.

In the border line case the perforation hole (4) is totally in the upper capacitor $C_1$, whereas the lower capacitor $C_2$ is totally filled with the dielectric "film" (3). One measure of the changes is the position of the upper and lower edges of the perforation hole (4), the hole position. The lateral limits have no influence.

The maximal change in the capacitances can be computed:
where $\Sigma f=2.5$; $\Sigma o=8.85419$ pF/m; $\Sigma el=1.0006$; d=0.2 mm; F=5.6 mm; hole size=5.6 mm$^2$; film thickness=0.1 mm by formula 1: 3) C min.=0.24 pF formula 2: 4) C max.=0.43 pF.

The measuring effect can be increased if one scans a plurality of perforation holes and their position equally.

If (see FIG. 4a) for example eight perforation holes (4a–4d; 4a'–4d') are detected (corresponding to a film image (5)) and if the capacity sensors ($C_{1a}$–$C_{1d}$, $C_{1a'}$–$C_{1d'}$, and/or $C_{2a}$–$C_{2d}$, $C_{2a'}$–$C_{2d'}$) are connected in parallel, the result is a total capacity change for the upper ($C_{1a}$–$C_{1d}$, $C_{1a'}$–$C_{1d'}$) and/or the lower ($C_{2a}$–$C_{2d}$, $C_{2a'}$–$C_{2d'}$) capacitors of:

5) $\delta \Sigma C_{top}$=1.52 pF

6) $\delta \Sigma C_{bottom}$=1.52 pF.

The achievable linear measurement range is equal to twice the perforation hole level, with deduction of a non-sensitive zone, which corresponds to the spacing of the capacitors C1/C2 (e.g. 0.2 mm depending on the layout):

7) measurement range ($\delta$ Z)=+/−1.75 mm.

FIG. 3 shows a circuit for processing the sensor signal.

The difference capacitor C1/C2 is operated in a bridge circuit (A). The bridge is fed with alternating current from a HF generator.

By using the potentiometer ($P_1$), the bridge can be compensated for the case of identical capacitances ($U_D$= minimum). A change in the capacitances causes a detuning of the bridge.

The difference voltage which is generated by the instrument amplifier (I1) is amplified by the operations amplifier OV1 and is fed to a peak voltage meter (SP, consisting of C2, C3, D1, D2).

By means of the operations amplifier OV2, the direct current signal is again reinforced and a possible offset correction is carried out.

Figure 4B:
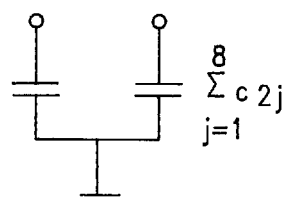
FIG. 4b the protective circuit of the capacities of the sensor from FIG. 3.

The horizontal image position is preferably measured directly at the image window (5). One example for realization is reproduced in FIG. 4a, in which FIG. 4b shows a schematic circuit.

The arrangement of the individual capacitors ($C_{1a}$–$C_{1d}$, $C_{1a'}$–$C_{1d'}$ and/or $C_{2a}$–$C_{2d}$, $C_{2a'}$–$C_{2d'}$) is shown as well as their position in relation to the projector window on the level of the image window (5) and therefore also to the center of the image. By this arrangement, the image is balanced towards the center.

The capacitors ($C_{1a}$–$C_{1d}$, $C_{1a'}$–$C_{1d'}$, and/or $C_{2a}$–$C_{2d}$, $C_{2a'}$–$C_{2d'}$) can be realized in the form of two printed circuits, which are opposite each other on the conductor side at a spacing of e.g. 0.2 mm, so that the film (3) can pass through them.

In an arrangement directly in the projector window, the printed circuit boards must have an opening in the center, which allows the projection.

With this arrangement, the projected image position is now only dependent on the errors in the photography, the copying process and the tolerances for the image position in relation to the perforation. Step errors on the projector side are no longer involved.

The offset of the image parallel to the direction of movement (vertical image position) can also be measured in the same way.

In this case, the capacitors have to be rotated through 90°. The upper and lower edges, as defined, then have no influence on the measurement result, but the lateral limits of the perforation holes 4 do have such influence.

It is naturally possible to carry out both measurements by the combination of the different capacitor arrangements.

A pure image position measurement as explained above has some disadvantages, which can be avoided by a somewhat different arrangement. When the perforation has faults (e.g. torn corners, strong pollution) the balancing can no longer be carried out as exactly as is desirable.

In the worst case it is assumed that one perforation hole is missing. This leads to the fact that the measurement bridge has a discrepancy in the actual center position. The total measurement path of 3700 $\mu$m corresponds to a maximal capacity change of 16 individual capacitors.

On the assumption which was made, the capacitance of an individual capacitor would not change, from which the error results:

8) 3700 $\mu$m/16=231 $\mu$m.

It is possible even to tolerate such a perforation error, which does not occur in practice, without the loss of precision.

Figure 5:
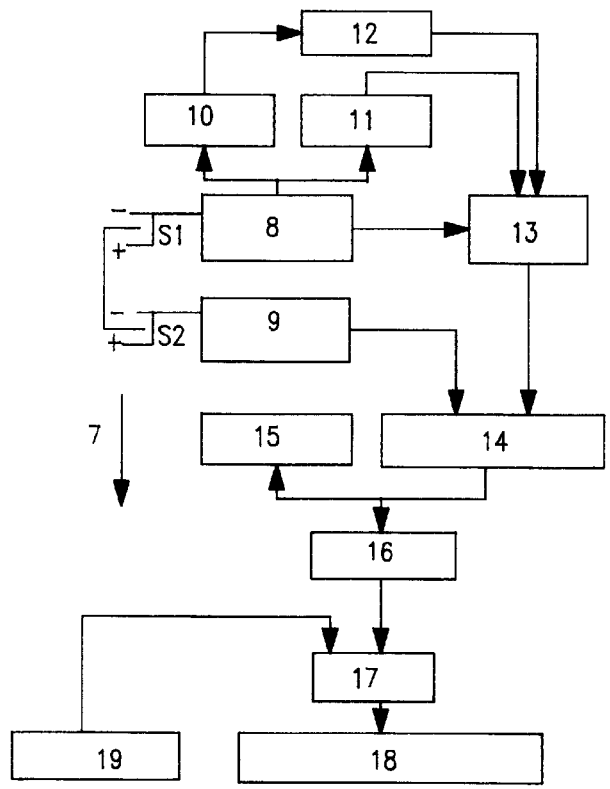
FIG. 5 a block diagram of a capacitive step size sensor.

This is possible with an expanded capacitive step size sensor, which is shown in FIG. 5 with the relevant signal processing as a block circuit diagram.

By using a capacitive sensor (8), the position (S1) of the image before the image window is measured. This position is defined as the zero point for the next step. The relevant measured value is stored by using a sample & hold circuit (13).

The film is transported further mechanically one step in the transport direction (7). The same hole image, which was previously used for detection of the zero point, is guided by the step in front of a further capacitive position sensor (9), in order to measure the actual step size.

Both the position sensors (8, 9) have with respect to the center of their sensitivity zone a well defined, mechanical spacing of 19 mm. The actual step size results from the following definition:

spacing of the zero points of both sensors (8, 9) plus the measured deviations S1 and S2 from the zero points.

In this way the actual step is measured directly at the film window.

Figure 6:
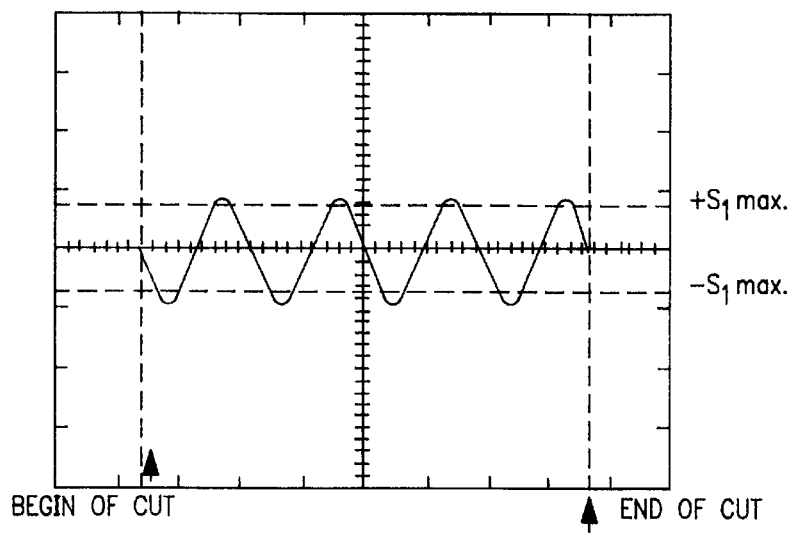
FIG. 6 the signal curve during a step in the sensor of FIG. 5.

The signal curve during one step is shown in FIG. 6.

Because during a 19 mm step, 4 perforation holes respectively pass through one capacitor, the signal curve which is shown results.

The signal is only dependent within +/– $S_{1max}$ linearly on the displacement path. In the minima and maxima, the output signal is independent of the path and it is constant. These dead zones correspond to a path of 0.2 mm and are caused by the spacing of the capacitors C1/C2 from each other.

Because for a measurement, only the values at the beginning and end of the step are decisive, the measurement signal must be processed in order to be able to ignore intermediate values.

This is realized in the block circuit diagram (FIG. 5) by the comparators (10, 11) and by the fade out network (12).

The first comparator (10) ensures that only signals within the linear path measurement zone are further processed. This is the case nine times during one step.

The fade out network (12) only sends the measurement signal to the sample & hold circuit (13) on the last underattainment of $S_{1max}$.

The second comparator (11) detects the end of the step and triggers the sample & hold circuit (13).

The film (3) is moved in FIG. 5 in the direction (7), in which one step is 19 mm. The top position sensor (8) measures the zero point, whereas the bottom position sensor (9) measures the step size. The measured value of the upper position sensor (8) then moves to one of two comparators (10, 11). The first comparator (10) checks the condition $S_1 < +/- S_{1max}$ and also causes a fade out (12). The second comparator (11) checks the condition $\delta S_1/dt = 0$ and sends its output signal directly to a sample & hold circuit (13). In addition, this sample & hold circuit (13) receives the signal from the first position sensor (8).

The output of the sample & hold circuit (13) and the output of the second position sensor (9) are located in a comparator circuit (14), which links the input values with each other as follows:

$$S_W-(+/-S_1)+(+/-S_2).$$

The circuit (15) supplies a reference signal for the step size 19 mm. In circuit (16), the difference is detected, which is used as the rated value in the PI control (17). The actual value is supplied by the rotational angle sensor (19), which is firmly connected with the torquer and/or with a plane-parallel plate (18) which is mounted on it. The PI control (17) then supplies an output signal which leads to an adjustment of the torquer and/or of the plane-parallel plate (18) mounted on it, until the desired state is attained.

The image content provides a further possibility for the measurement of step sizes.

This can be done as follows:

By means of a fixed optical sensor (e.g. a CCD camera) which is connected rigidly with the projector, the momentary image can be detected and stored. The next image with the same content must appear exactly at the same point in a spacing of 19 mm. If this not the case, an image steadiness error is present. The deviation can be computed by signal processing.

In practice it is not possible to move the film mechanically into the desired position. The difference signal can be used more efficiently as in the control signal for the optical compensation described above, which brings the image on the screen to cover the preceding image.

The process is compatible with all the known processes and films, materials and is independent of camera producers, copying processes etc.

Figure 9:
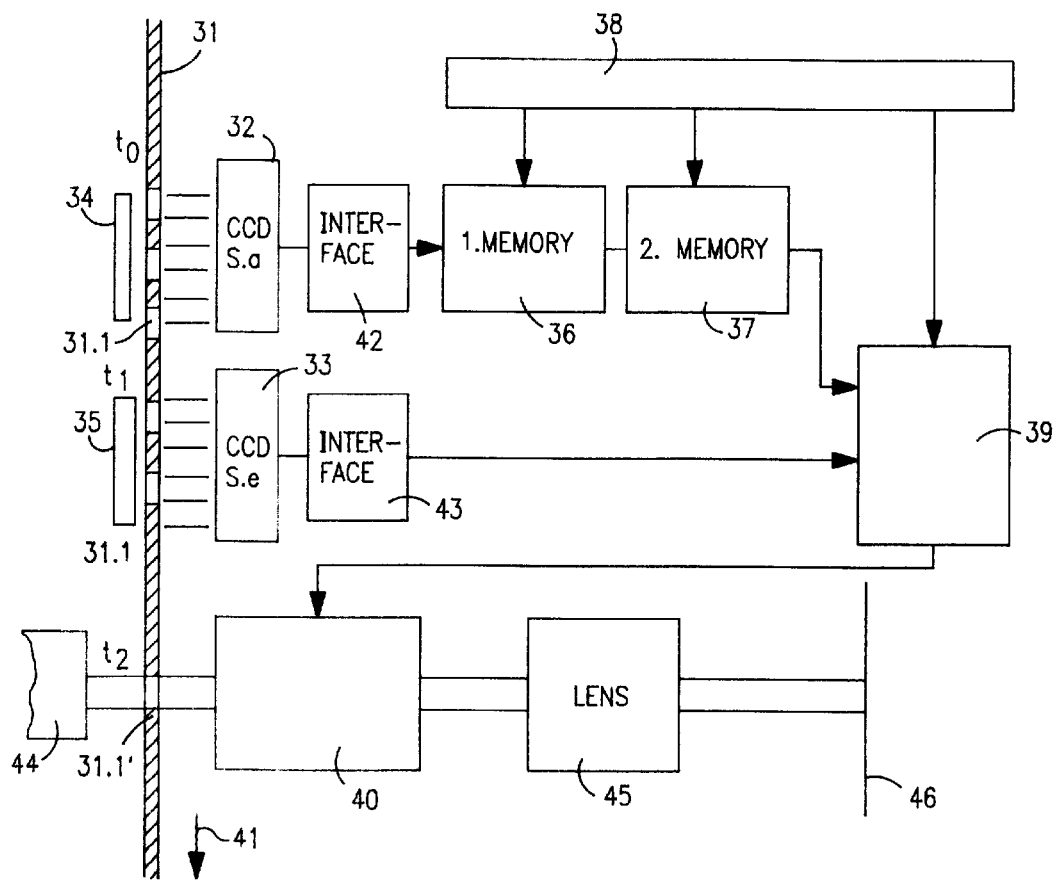
FIG. 9 a functional diagram of a total system for step size compensation control by the image content.

A total system for an image content-controlled step size compensation is now shown in FIG. 9.

Above the image window in 19 or 38 mm spacing there are respectively one CCD image sensor (32, 33) at the beginning and end of the step. The film image (31) which is in front of these sensors (32, 33) is evenly illuminated by two flat light sources (34, 35).

The two CCD image sensors (32, 33) are respectively connected via an interface (42, 43) with the memory (36) and/or with the comparator (39).

In the zone of the optical compensation (40), the light from the ray source (44) which is allowed through by the film strip (31) is imaged by a lens (45) on a screen (46). The arrow (41) shows the direction of movement of the film strip (31). The image (31.1") which is imaged by the lens (45) at the point in time $t_2$ on the screen (46) corresponds to the image (31.1) at the point in time $t_0$ before the first CCD sensor (32).

After the end of a transport step at the time $t_0$, the CCD sensor (32) scans the image (31.1) in front of it at the beginning of the step. The detected image (31.1) is stored in the first image memory (36).

The film strip (31) is transported one step further on and at the time $t_1$ the previously scanned image (31.1') is already in front of the second CCD sensor (33) at the end of the step.

The control unit (38) moves the content of the first image memory (36) into the successive second image memory (37). At the input of comparator (39), the image signals are present simultaneously at the times $t_0$ and $t_1$. This is the same image (31.1, 31.1'), but taken at different positions (before/after the step).

While the control unit (38) moves the image (31.1) from the first memory (36) to the second memory (37), the next image is detected and is stored in the first image memory (36).

In the comparator (39), the position of the image (31.1) can be compared before and after the step. There are the most varied methods for this purpose. If no image steadiness error is present, e.g. the difference of both images is equal to zero. In the case of an inexact transport step, the signal is not equal to zero, with positive or negative signs depending on the position.

In a CCD element (32, 33) the image information is deposited line by line. By moving the image information upwards or downwards in the line spacing (corresponding to the film transport direction) the difference between the two images can be made zero. The number of the lines and the direction of movement indicate the image steadiness error. This signal can be adduced as a control signal for optical compensation (40).

In this connection, it is immaterial that the optical compensation (40) displaces the ray path of another image, if one assumes that the film strip (31) can be viewed as rigid at least in a range of 3 consecutive images (no change in length of the strip). The decisive factor is that before each transport step, a new reference point is determined, which is oriented towards the image content. This reference point is viewed as a measurement for the exact step.

It is not absolutely necessary to compare the total content of the image. The abundance of information can be reduced, by image processing, to the essential content, as is known for video cameras from image stabilization devices.

A disadvantage of the proposed system is the relatively high costs which have to be spent for realization. After all, two CCD cameras (32, 33) and image processing are required. But there are possibilities for a solution which is more efficient in cost, based on the same fundamental considerations.

In order to obtain a more economical image content sensor, the following preconditions must be fulfilled:

in order to arrive in the zone in which an image steadiness error is no longer visible, a sensor is needed with a local resolution of
resolution <=7.35 $\mu$m (7.35 $\mu$m correspond to an image steadiness of 0.035% with a 35 mm film).

This can be achieved without an enlarging lens with static scanning only when using CCD elements (pixel min. 7×7 $\mu$m).

Figure 10A:
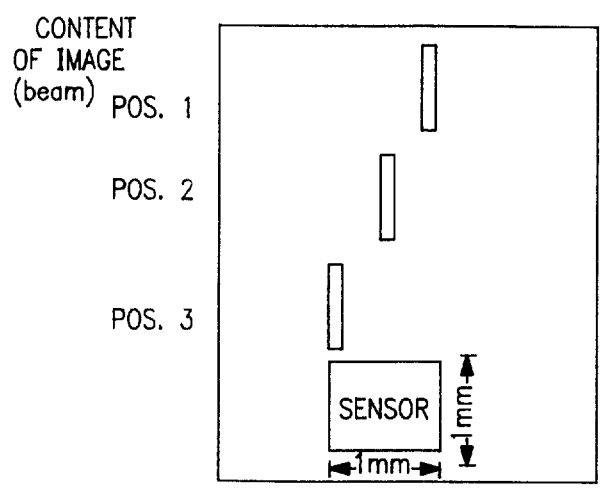
FIG. 10a the diagram of a static scanning.

If one makes use of the fact that in a projector the film is transported in any case, this resolution is also realizable by using a simple photodiode with a large active area of, for example, 1×1 mm>>, as the following considerations show (see FIG. 10a in this connection).

With static scanning (image/bar fixed, sensor fixed), the output signal of the sensor is constant, irrespective of the position of the bar (pos. 1, pos. 2, pos. 3). A resolution of the image which is smaller than the active sensor area is not possible.

Figure 10B:
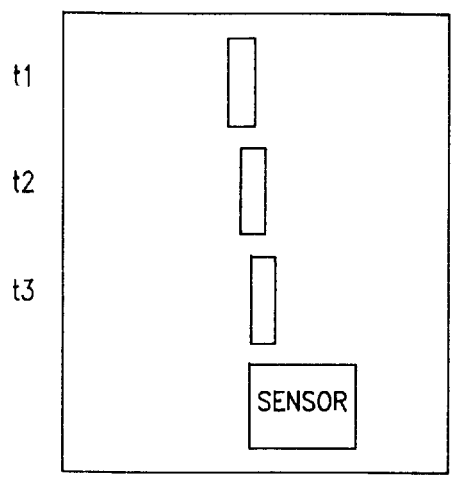
FIG. 10b the diagram of a dynamic scanning.
Figure 10C:
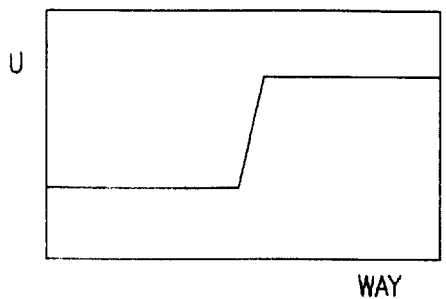
FIG. 10c the output signal in the scanning in accordance with FIG. 10b.

The conditions are different when the image, as shown above, is moved past the sensor (see in this connection FIG. 10b). The output signal U (see FIG. 10c) alters immediately after the bar has begun to cover the sensor area. The smaller the area of the sensor, the steeper is the signal rise. The active sensor area no longer limits the local resolution capability, as in the case of static scanning.

The disadvantage of this process is that additional path information is necessary, in order to be able to allocate a measured reduction in light to an exact point on the image. With a CCD element, this is done automatically by the positions of the individual pixels on the sensor element. They are a component of the sensor and therefore their position is fixed.

Such a path measurement has been described as a position sensor which is described with respect to FIGS. 2 to 6 under the heading of capacitive image position and step size sensor.

Figure 11:
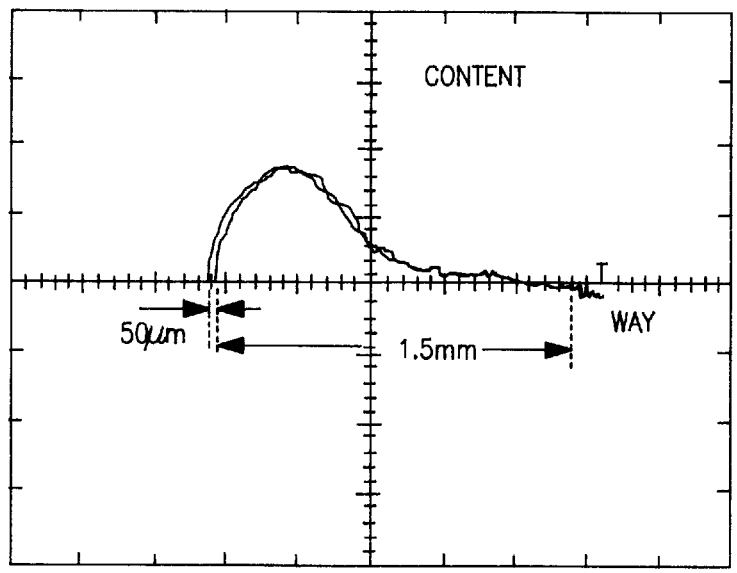
FIG. 11 the image content measured by the photodiode and capacitive displacement sensor.

The subsequent FIG. 11 shows an image content measurement of a film image which was carried out in practice in accordance with this method, measured using a photodiode and capacitive image sensor. The image was moved past a photodiode (1×1 mm>>), and the film was illuminated at this point by a LED. The transport path which is associated for the reduction of light was simultaneously measured using a capacitive image position sensor (which also permits continuous path measurement). The curve which is shown illustrates the image content measured in this way. The sensor signal is drawn in relation to the path. It is immaterial in this connection that this curve appears to be slightly different for each image.

The curve thus obtained is stored. The image associated with this curve is now moved on by one step past a second photodiode, which is in the direct transport direction and has a well-defined spacing (19 mm) from the first sensor. With an exact transport step, the two curves overlap and the difference is zero.

Figure 12:
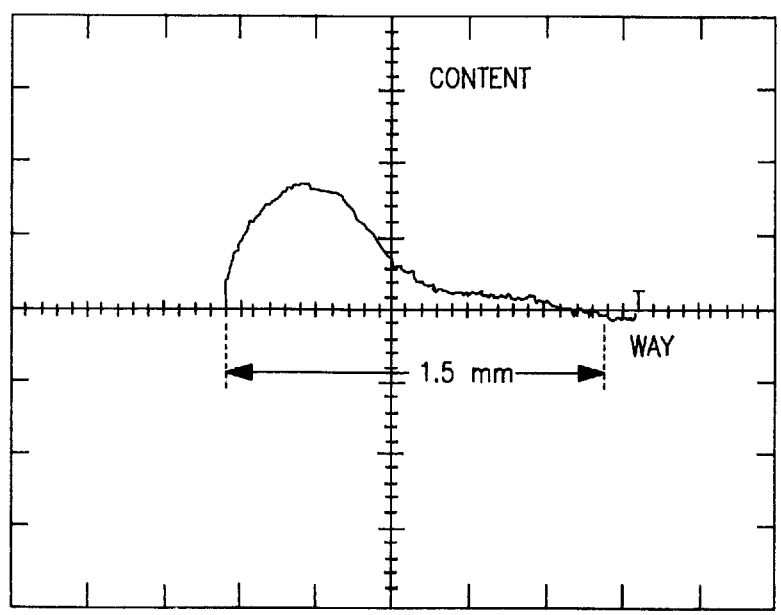
FIG. 12 the measured image steadiness error by contour comparison.

In FIG. 12, the situation is shown which occurs on a step error. The displacement route ŠWeg, which is needed to bring the two curves to overlap, corresponds to the control signal for optical compensation. In the drawing, there is a deviation of about 50 μm, measured with a photodiode having an active sensor area of 1000 μm.

When using this method, it is not possible to detect the entirety of the image content, but this is also not necessary. It is sufficient if marked profiles are found which make possible a rediscovery of the image content. In order to increase the precision, two diode arrays can be used transversely to the transport direction of the film. The respective opposing diodes generate the contours dependent on the image content, which are compared and which supply the control signal for the optical compensation.

Figure 13:
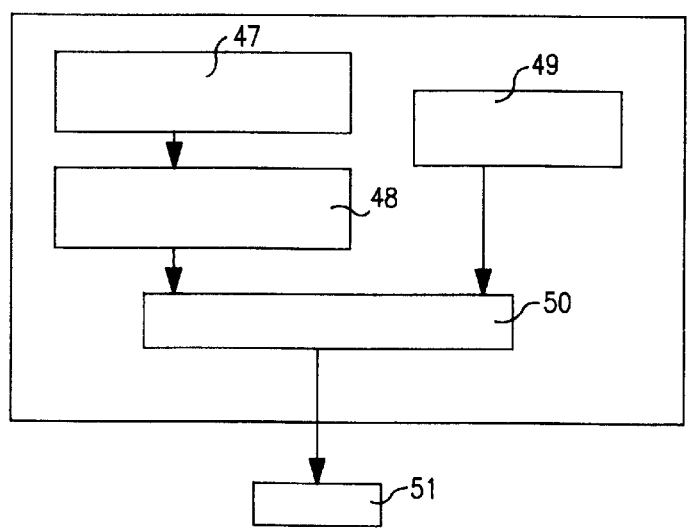
FIG. 13 the block circuit diagram of a simplified image content sensor.

FIG. 13 shows the schematic structure of such a simplified image content sensor. The block circuit diagram of the simplified image content sensor, which is shown here, has a (e.g. capacitive) displacement sensor (47), which sends its signal to a circuit (48) for the signal conditioning of the transport path. This circuit (48) generates an output signal which is used together with the signal from the optical image scanning (49) as an input signal to a circuit (50) for marking the image content. Its output signal then becomes the control signal for optical compensation (51).

Figure 14:
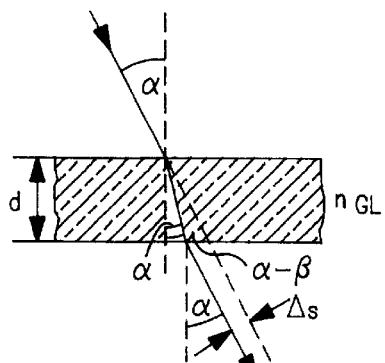
FIG. 14 a graphic illustration of the Snellius refraction law.

FIG. 14 shows the conditions of the Snellius law in graphic form, as was discussed above (page 7).

Figure 15:
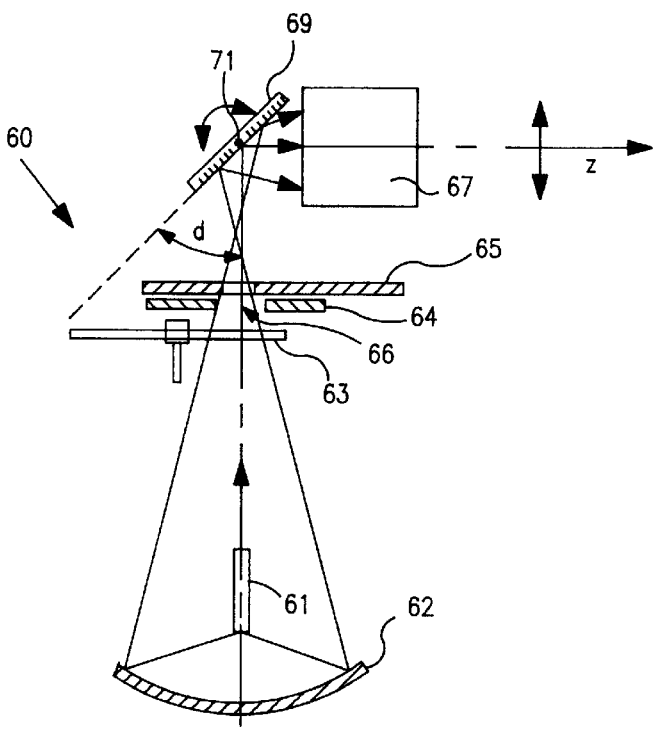
FIG. 15 the functional structure of another optical compensation means for step errors including a hollow mirror.

FIG. 15 shows an optical compensation device 60 with a concave mirror 62, from the centre of which a xenon bulb 61 projects light on to the mirror 69, which is projected via the upstream rotating diaphragm 63 and the image window 64 on to the film strip 65, transported image by image. The rotating diaphragm 63 then interrupts the illumination ray path during the film transport. Between the imaging lens 67 and the illuminated film strip 65, there is a tiltable flat mirror 69 which is rotatable through an angle a. The tilting of the flat mirror through a preset angle causes an identical change in the angle of reflection to that of the angle of incidence of the ray path. The ray path is therefore displaced parallel to the angle of rotation 71 of the flat mirror 69, ant thus also the image 66 of the film strip 65 which is projected by the lens 67 on to the screen. By determining step error via sensors and by corresponding tilting of the flat mirror, a step error can be compensated for optically.

Figure 16:
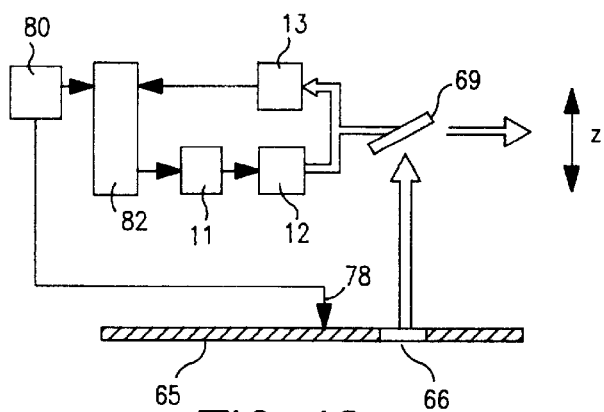
FIG. 16 a schematic functional diagram using the functional structure of FIG. 15.

In accordance with FIG. 16, the displacement of the projected image 66 of the film strip 65 is carried out within the zone Z in the direction of the arrow. Sensors 78, 80 detect step errors and cause a corresponding tilting of the flat mirror 69 by a control circuit which is similar to that described in connection with FIG. 7, including a comparator 82. Thereby even with film transport which is not mechanically correct, the image being projected momentarily comes to cover the previous image.

Figure 18:
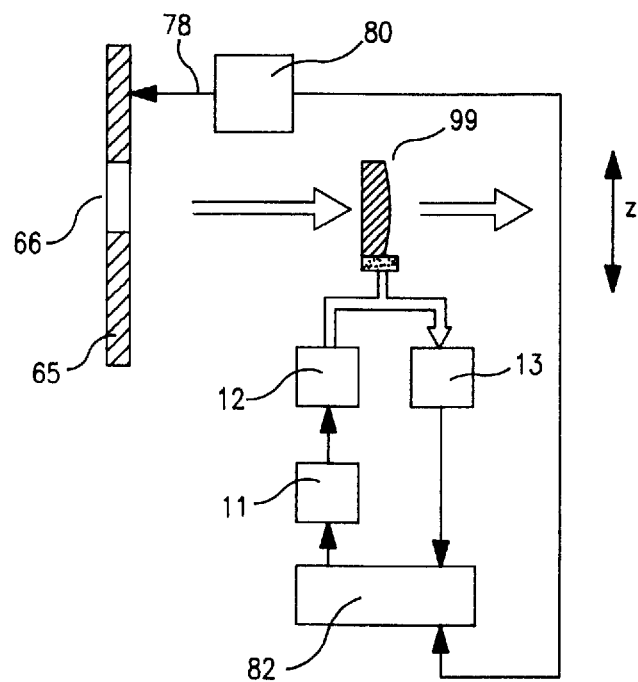
FIG. 18 a schematic functional diagram using the functional structure of FIG. 17.

FIGS. 16 and 18 show the interrelationship between function and control of the optical compensation. An image position sensor 78, 80 (e.g. a capacitive image position and step width sensor) measures the film motion for the step beginning and/or for the step end. Under the given conditions a linear measuring path of ±−0.5 mm is sufficient.

This measured value is a setting value. It is converted to a signal proportional to the rotary angle and is fed to a regulator 82. A torquer, scanner or possibly a stepping motor (12) is triggered via a power step or motor drive (11) and tilts the flat mirror 69 or the lens 99, respectively, proportionally to the path, i.e. the path signal is converted to a path-relevant, antiphase tilting angle for the flat mirror 69 or lens 99. The flat mirror 69 or the lens 99 is rigidly coupled to an angle sensor 13 that in turn supplies the actual value for the comparator or regulator 82.

The luminous efficiency factor is increased by the controlled movement of the flat mirror 69 or lens 99, respectively. The covering angle of the shutter flap in this is reduced in size without resulting in diminished contrast or a blurred image.

Image migration becoming visible at the step beginning and step end is brought about by the optical compensation in the shape of the tiltable flat mirror 69 or lens 99, respectively. A controlled compensation is employed in that the path of the film strip is measured via a suitable sensor 78, 80 at the beginning and the end of the step.

Figure 17:
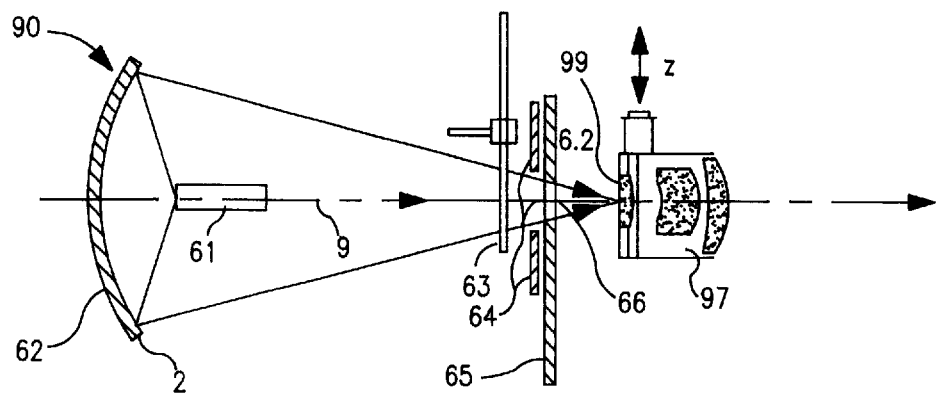
FIG. 17 the functional structure of a third optical compensation means for step errors including a lens.
Figure 19:
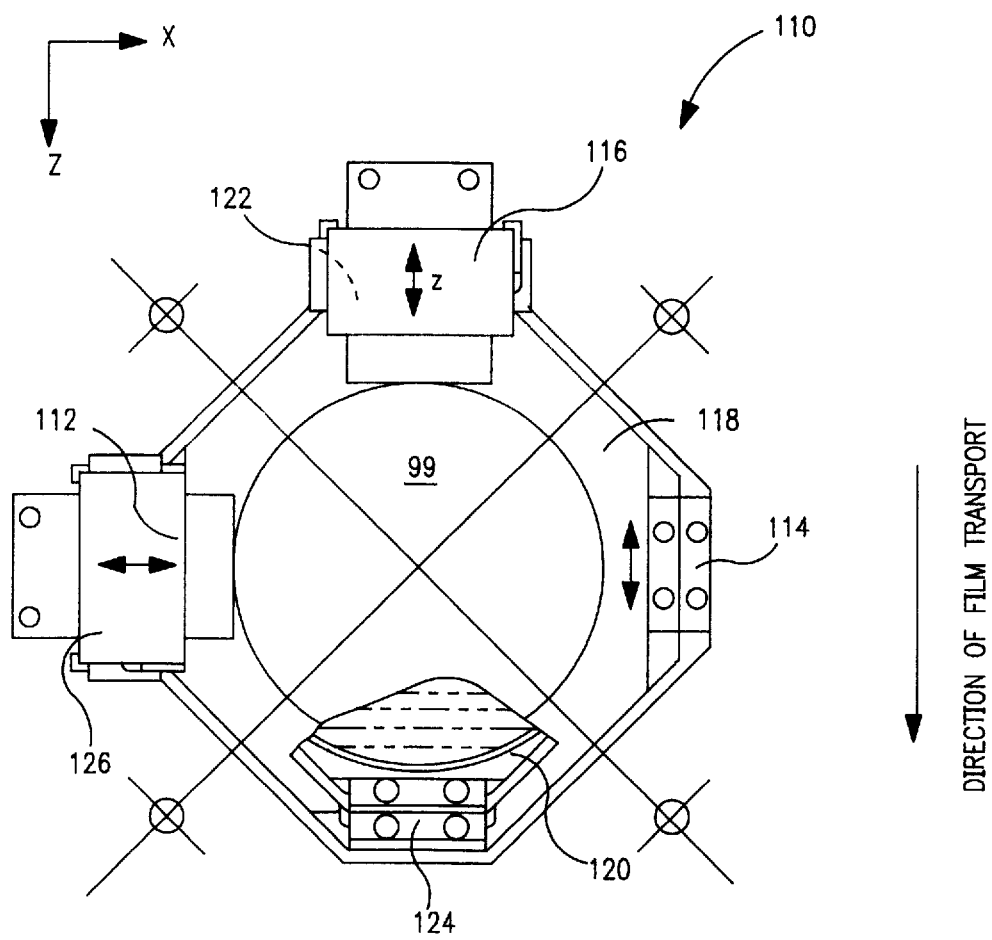
FIG. 19 the total configuration of an optical compensation means including a lens.

FIG. 17 shows a lens 99 which is axially displaceable in the Z direction as the optical compensation element of a cinematic film projector 90, in which the same parts have the same reference numbers as in FIG. 15. The projection lens is here marked in its totality as 97. The lens 99 which is upstream from lens 97 is in this connected decoupled from the latter and it can be displaced transversely to the ray path in the Z direction, in order to achieve a compensation for step errors. The sensor detection and control is carried out in this context exactly as in the opto-mechanical compensation devices which were described above, wherein FIG. 18 shows a schematic illustration with identical parts which are marked in the same way. The lens 99 has to have a suitable support and a suitable controllable motor drive. FIG. 19 shows a mechanical total plan of an opto-mechanical or optical compensation by means of a lens 99, which is transversely movable in the Z direction. A closed acceptor ring is marked here in general as 110. Within the acceptor ring 110, the lens 99 is supported by means of a parallel guide 112, 114 so that it is displaceable in the Z direction. As the drive device, in the embodiment which is shown, there is a linear motor 116, which is firmly connected with the holder for the lens 97 and therefore can displace the latter parallel to the direction of movement Z of the film strip. A step error can also be optically compensated for thereby. In this conneotion, the same control is used as in the other embodiments.

As was mentioned above, in addition to an image state error or step error in the Z direction, a vertical, lateral image state error may also occur in a direction X, which is perpendicular to Z. In principle, this can be compensated for optically in the same way as in the case of an image state error in the Z direction. In order to make possible a displacement of the lens in the X direction as well, in FIG. 19 X/Z guidance is provided. In this case, the lens is supported additionally by an inner ring 120, which is positioned over a parallel guidance 122, 124. This inner ring 120 is connected with a second linear motor 126 in a power transmitting manner, which drives the X component of the lens 97 and can thereby carry out a lateral image state correction. The sensory mechanism and control are substantially identical here with the means described above.

We claim:

1. An apparatus for measurement of the image position in a projector during the projection of elongate strips of film, wherein each film strip, which has therein individual images, is moved step by step to advance successive image thereof past the projection lens and into registry with the projector's image window, each of the film strips having therethrough adjacent said images longitudinally spaced perforations, and wherein a capacitative differential sensor is arranged in the projector to register with successive perforations in a film strip for effecting the measurement of the image steadiness error.

2. An apparatus in accordance with claim 1, wherein the sensor is composed of two, spaced, registering capacitors, which are adapted to confront opposite sides of the successive perforations, and wherein the two capacitors are arranged to be symmetrical with respect to successive perforations.

3. An apparatus in accordance with claim 1, wherein a parallel circuit of a plurality of capacitors is provided in the apparatus to increase the precision of the effected measurement.

4. An apparatus in accordance with claim 1, wherein the sensor for the measurement of the film position is arranged directly above the film strip on the level of the projector's image window and, independently of the optical property of the film.

5. An apparatus in accordance with claim 1, wherein two of said capacitive differential sensors are arranged in the apparatus at a space corresponding to a rated step size in order to measure each actual step size.

6. A device for the correction of an image steadiness error of motion picture films, wherein a film strip having thereon individual images is moved by a projector step by step past a projection lens, and including an optical compensator, comprising at least one transparent glass plate, a lens which can be displaced translatorily (xyl) in a plane perpendicular to the optical axis (Z), or rotary wedges, said compensator being arranged as a device for step size compensation in the imaging ray path before the film strip or before an optical recording medium, respectively, in said projector.

7. A method for the reduction of the image steadiness error in the projection of elongate film strips by a film projector, wherein each film strip comprises a series of individual images and Is moved step by step past a projection lens to place successive images in registry with an image window, the image steadiness error being detected in the projector by a plurality of spaced optical sensors and being compensated for by a device for step size compensation, and wherein the correction of the image steadiness is carried out on the basis of deviations of the actual values of an image step size relative to a preset value with respect to the image window, as measured by the sensors, and in the following steps:
a) detecting each image position in relation to the image window in the projection plane of an image,
b) determining each image position by at least one of said sensors before a film step and by at least one other of said sensors after a film step,
c) measuring the advance or transport of the film strip for each step, and
d) compensating for the measured difference between the actual and preset step size values by means of the step size compensation.

8. A method in accordance with claim 7, including providing an optical step size compensation by inserting an optical compensator into the ray path of the film projector before the film strip in the form of at least one transparent glass plate which can be pivoted, as a turnable prism, or as a translatory displaceable lens in a plane perpendicular to the optical axis of the projector.

9. A method in accordance with claim 7, including scanning the image content of a cinema film in a film projector to effect image content-controlled step size compensation.

10. A method in accordance with claim 9, including effecting said scanning by moving the cinema film images past said optical sensor.

11. A method in accordance with claim 10, including increasing the precision of the scanning step by moving each of said film images past a plurality of optical sensors.

12. A method in accordance with claim 11, including measuring the transport step of the film to detect the luminosity distribution (contour curve) which is specific to an individual image of the film.

13. A method in accordance with claim 12, including storing a measured contour curve for the time offset differential measurement of a respective image-specific contour before and after said transport step.

14. A method in accordance with claim 10, including controlling said optical and image content-controlled compensations by controlling the image content.

15. A method in accordance with claim 10, wherein said step of image scanning is carried out directly on the film image in immediate proximity of the image window.

16. A method in accordance with claim 15, including effecting a step size measurement by using capacitive sensors mounted adjacent said image window to register with spaced perforations in said film, and utilizing said capacitive sensors to establish said preset value for the later differential measurement.

17. A method in accordance with claim 16, including causing a measurement of the vertical image offset to be carried out by capacitive sensors, which are rotated through 90°.

18. A method in accordance with claim 16, including utilizing the method for the correction of image steadiness when taking photographs with a film camera.

* * * * *